United States Patent
Bertero et al.

(10) Patent No.: US 6,730,420 B1
(45) Date of Patent: May 4, 2004

(54) MAGNETIC THIN FILM RECORDING MEDIA HAVING EXTREMELY LOW NOISE AND HIGH THERMAL STABILITY

(75) Inventors: Gerardo Bertero, Redwood City, CA (US); Tu Chen, Monte Sereno, CA (US); Charles Chen, Milpitas, CA (US); Wei Cao, Milpitas, CA (US)

(73) Assignee: Komag, Inc., San Jose, CA (US)

( * ) Notice: Subject to any disclaimer, the term of this patent is extended or adjusted under 35 U.S.C. 154(b) by 178 days.

(21) Appl. No.: 09/703,607

(22) Filed: Oct. 31, 2000

(51) Int. Cl.$^7$ ............... G11B 5/66; G11B 5/70; B05D 5/12
(52) U.S. Cl. ............ 428/694 TS; 428/694 TM; 428/900; 428/216; 428/336; 427/131; 427/132
(58) Field of Search .............. 428/694 TS, 216, 428/336, 212, 694 TM; 427/131, 132

(56) References Cited

U.S. PATENT DOCUMENTS

| | | | |
|---|---|---|---|
| 4,652,499 A | 3/1987 | Howard et al. | 428/641 |
| 5,051,288 A | 9/1991 | Ahlert et al. | 428/64 |

(List continued on next page.)

FOREIGN PATENT DOCUMENTS

| | | |
|---|---|---|
| EP | 704839 A1 | 4/1996 |
| JP | 3277487 | 10/1991 |
| JP | 3294893 | 10/1991 |
| JP | 5109043 | 4/1993 |
| JP | 5120663 | 5/1993 |
| JP | 6277893 | 11/1994 |
| JP | 6285325 | 11/1994 |
| JP | 7150533 | 6/1995 |
| JP | 8147660 | 6/1996 |

OTHER PUBLICATIONS

Williams and Comstock, "An Analytical Model of the Write Process in Digital Magnetic Recording", 17th Annual AIP Conf. Proc., Part I, No. 5, 1971, pp. 738–742.
Zhu et. al., "Micromagnetic Studies of Thin Metallic Films", Journal of Applied Physics, vol. 63, No. 8, 1988, p. 3248.
Chen et. al., "Physical Origin of Limits in the Performance of Thin–Film Longitudinal Recording Media", IEEE Trans. Mag., vol. 24, No. 6, 1988, p. 2700.
Cullity, B.D., "Elements of X–ray Diffraction", Addison Wesley Publishing Co., Chapter 2.
Daval, J. and Randet, D., "Electron Microscopy on High Coercive Force Co—Cr Composite Films", IEEE Trans. Mag., MAG–5, No. 4, Dec. 1970, p. 768–773.

(List continued on next page.)

Primary Examiner—Holly Rickman

(57) ABSTRACT

A magnetic medium having at least two intermediate layers between an underlayer and a magnetic layer. The first intermediate layer is designed to provide a good lattice match to the underlayer, while the second intermediate layer is designed to provide a good lattice match to the magnetic layer. Typically, the underlayer has one structure, such as body centered cube, while the magnetic layer has a second structure such as hexagonal close pack. In preferred embodiments, the transition from the one structure to the other structure occurs in the intermediate layers. For example, the first intermediate layer may be a hexagonal close pack structure. Because of the mismatch between the underlayer and the first layer, there may be crystal defects in this first intermediate layer. However, any remaining stress and mismatch is absorbed through the second layer, so that the second layer presents a substantially defect-free surface on which the magnetic layer may grow. Because the second layer is closely matched to the magnetic layer, the magnetic layer continues to grow in a defect-free fashion. In other embodiments of the present invention, a spacer layer having a hexagonal close pack structure may be used between two or more portions of a magnetic layer.

42 Claims, 9 Drawing Sheets

U.S. PATENT DOCUMENTS

| | | | |
|---|---|---|---|
| 5,063,120 A | 11/1991 | Edmonson et al. | 428/694 |
| 5,462,796 A | 10/1995 | Teng et al. | 428/336 |
| 5,534,355 A | 7/1996 | Okuno et al. | 428/611 |
| 5,569,533 A | 10/1996 | Lal et al. | 428/332 |
| 5,587,235 A | 12/1996 | Suzuki et al. | 428/332 |
| 5,607,740 A | 3/1997 | Noda | 428/65.3 |
| 5,616,370 A | 4/1997 | Okuno et al. | 427/547 |
| 5,626,970 A | 5/1997 | Hedgcoth | 428/611 |
| 5,693,426 A | 12/1997 | Lee et al. | 428/611 |
| 5,696,653 A | 12/1997 | Lacey | 360/104 |
| 5,820,963 A | 10/1998 | Lu et al. | 428/65.3 |
| 5,824,409 A | 10/1998 | Sellmyer et al. | 428/332 |
| 5,830,569 A | 11/1998 | Hikosaka et al. | 428/332 |
| 5,840,394 A | 11/1998 | Ranjan et al. | 428/65.3 |
| 5,846,648 A | 12/1998 | Chen et al. | 428/332 |
| 5,849,369 A | 12/1998 | Ogawa | 427/539 |
| 5,851,656 A | 12/1998 | Ohkubo | 428/332 |
| 5,858,566 A | 1/1999 | Zhang | 428/694 |
| 5,900,324 A | 5/1999 | Moroishi et al. | 428/611 |
| 5,922,442 A | 7/1999 | Lal et al. | 428/216 |
| 5,922,456 A | 7/1999 | Tanahashi et al. | 428/332 |
| 5,968,679 A | 10/1999 | Kobayashi et al. | 428/694 |
| 5,993,956 A | 11/1999 | Lambeth et al. | 428/332 |
| 6,001,447 A | 12/1999 | Tanahashi et al. | 428/65.3 |
| 6,010,795 A | 1/2000 | Chen et al. | 428/611 |
| 6,027,801 A | 2/2000 | Maro et al. | 428/332 |
| 6,077,586 A * | 6/2000 | Bian et al. | 428/65.3 |
| 6,168,861 B1 * | 1/2001 | Chen et al. | 428/336 |
| 6,280,813 B1 * | 8/2001 | Carey et al. | 428/65.3 |
| 6,372,330 B1 * | 4/2002 | Do et al. | 428/212 |

OTHER PUBLICATIONS

Lazarri, J.P. et al., "Experimental Studies Using In–Contact Recording on Chromium–Cobalt Films", IEEE Transactions on Magnetics, vol. MAG–5, No. 4, Dec. 1969, p. 955–959.

Nolan, T.P. et al., "Effect of Microstructural Features on Media Noise in Longitudinal Recording Media", Journal of Applied Physics, vol. 73, No. 10, May 15, 1993, p. 5566–5568.

Hono K., et al., "Crystallography of Co/Cr Bilayer Magnetic Thin Films", Journal of Applied Physics, vol. 68, No. 9, Nov. 1, 1990, p. 4734–4740.

Deng, Y. et al., "Magnetic Properties and Crystal Texture of Co Alloy Thin Films Prepared on Double Bias Cr", Journal of Applied Physics, vol. 73, No. 10, May 15, 1993, p. 6677–6679.

Tsai, H.C. et al., "Preferred Orientation in Cr– and Co–Based Thin Films and its Effects on the Read/Write Performance of the Media", Journal of Applied Physics, vol. 71, No. 7, Apr. 1, 1992, p. 3579–3585.

Lee et al., "NiAl Underlayers for CoCrTa Magnetic Thin Films", IEEE Trans. On Mag., vol. 30, No. 6, Nov. 1994, pp. 3951–3953.

Lee et al., "Effects of Cr Intermediate Layers on CoCrPt Thin Film Media on NiAl Unerlayers", IEEE Trans. On Mag., vol. 31, No. 6, Nov. 1995, pp. 2728–2730.

Yamaguchi et al, "Recording Characteristics of CoCrTa, CoCrPt Double Layer", 15th Annual Japanese Applied Magnetic Conference, 1991, Paper 1aA–11.

Kodama, K. et al., "Magnetic Properties of CoCrTa, CoCrPt Double Layers", 15th Annual Japanese Applied Magnetic Conference, 1991, Paper 1aA–10.

Glijer P., G. et al., "Advanced Multilayer Thin Films for Ultra–High Density Magnetic Recording Media", IEEE Transactions on Magnetic, vol. 30, No. 6, Nov. 1994, p. 3957–3959.

Fang, Leo Li Zen and Lambeth, David N., "New High Coercivity Cobalt Alloy Thin Film Medium Structure for Longitudinal Recording", Applied Physics Letters, vol. 65, No. 24,.

Zhang, B. et al., "CoCrTa/CoCrPtTa Double Layer Films for Magnetic Recording", IEEE Transactons on Magnetics, vol. 32, No.5, Sep. 5, 1996, p. 3590–3592.

Zou, J. et al., "CoCrTa Intermediate Layers on NiAl Underlayers for CoCrPt Longitudinal Thin Film Magnetic Media", MMM Intermag Conf., Jan. 1998, Abstract No. CC–09.

Takahashi M. et al.., "The Ultra Clean Sputtering Process and High Density Magnetic Recording Media", IEEE Transactions on Magnetics, vol. 33, No. 5, Sep. 1997, p. 2938–2943.

Nguyen, T.A. and Howard, J.K., "Enhanced Coercivity in CoPtCr Thin Film Media using CrV Underlayer", Journal of Applied Physics, vol. 73, No. 10, May 15, 1993, p. 5579.

Lazarri, J.P. et al., "Thin Evaporated Films with High Coercive Force", IEEE Transactions on Magnetics, MAG–3, Sep. 1967, p. 205–207.

Lal, B. et al., "Effect of Very Thin Cr–Underlayer on The Magnetic and Recording Properties of CoCrTa Thin–Film Media", IEEE Transactions on Magnetics, vol. 30, No. 6, Nov. 1994, p. 3954–3956.

Sanders, I.L. et al., "Media Noise in Periodic Multilayered Magnetic Films with Perpendicular Anisotropy", Journal of Applied Physics, vol. 68, No. 4, Aug. 15, 1990, p. 1791–1795.

Sellmyer, D.J. and Wang, D., "Magnetic and Structural Properties of CoCrTa Films and Multilayers with Cr", Journal of Applied Physics, vol. 67, No. 9, May 1, 1990, p. 4710–4712.

* cited by examiner

Figure 1: Crystallographic planes and directions in hexagonal cobalt crystal.

Figure 2: Crystallographic planes and directions in cubic chromium crystal.

Figure 3: Epitaxial relationship between $(001)_{Cr}$ plane and $(2\bar{1}\bar{1}0)_{Co}$ plane.

Figure 8: Δa represents interfacial misfit strain.

MAGNETIC THIN FILM RECORDING MEDIA HAVING EXTREMELY LOW NOISE AND HIGH THERMAL STABILITY

FIELD OF THE INVENTION

The present invention relates generally to magnetic recording media used in rigid disc drives commonly used for computer data storage and methods of making the same.

BACKGROUND

In the hard disk drive industry, ever-increasing recording density demands continuous improvement in hard disk recording media so as to support a higher linear recording density (thousands of flux changes per inch-KFCI) and track density (thousands of tracks per inch-KTPI). Recording density is proportional to the product of KFCI and KTPI, and is typically expressed as giga-bits per square inch (Gb/in$^2$). Currently the recording density is increasing at compound annual growth rate of approximately 100%.

In order for the media to be able to support high KFCI (e.g., over 250 KFCI), the pulse width (PW$_{50}$-pulse width at 50% of pulse amplitude) needs to be as small as possible to reduce the inter-symbol interference so that high resolution at high recording density can be obtained. The resolution is defined as the pulse amplitude at high frequency divided by the pulse amplitude at low frequency. Based on generally known magnetic recording theory, in order to reduce PWso and hence increase resolution, the magnetic recording media must have high coercivity, Hc. For today's typical recording density of 4 Gb/in$^2$, the value of Hc needs to be on the order of 3000 Oe, and in future it needs to be greater for even higher recording density. Other means of reducing PW$_{50}$ include increasing the hysteresis loop-squareness, generally defined as "S" which is ratio of remanent to saturation magnetization (Mr/Ms), increasing the coercivity squareness "S*", increasing the remanent coercivity squareness "S*$_{rem}$", and narrowing the switching field distribution ("SFD"), as described by William and Comstock in "An Analytical Model of the Write Process in Digital Magnetic Recording," A.I.P. Conference Proceedings on Magnetic Materials 5, p. 738 (1971).

Another factor which is important for increased KFCI and KTPI is that the signal to noise ratio (SNR) must be maximized. There are contributions to SNR from the electronics and the channel used to process the magnetic signal. But there is also intrinsic noise from the media that must be minimized. The largest contribution to the media noise is generated from the interparticle (or intercrystalline) magnetic exchange interaction. To suppress this exchange interaction, one must isolate the magnetic crystals from each other by one or more nonmagnetic elements (such as Cr atom) or compounds. The amount of separation need be only a few angstroms for there to be a significant reduction in intergranular exchange coupling. Another source of intrinsic media noise is the size or dimension of the magnetic grain. At recording densities of 4 Gb/in$^2$ and greater, the bit size along the track is less than 0.1 μm. Therefore to prevent the excessive noise arising from the physical dimensions of the grain, the diameter of each magnetic grain on the average should be less than approximately 0.01 μm (10 nm) at this density, and even smaller for greater densities. Intrinsic media noise has been theoretically modeled by J. Zhu et al. in "Micromagnetic Studies of Thin Metallic Films" in Journal of Applied Physics, Vol. 63, No. 8, (1988) p. 3248–53 which is incorporated by reference herein. T. Chen et al. also describe the source of intrinsic media noise in "Physical Origin of Limits in the Performance of Thin-Film Longitudinal Recording Media" in IEEE Transactions on Magnetic, Vol. 24, No. 6, (1988) p. 2700–05 which is also incorporated by reference herein.

The noise of the media can be reduced by decreasing the grain of the media, however smaller grain size may reduce Hc due to the onset of the superparamagnetic effect which comes about due to an inability of the grain to support the magnetization when it competes with the thermal fluctuation. In general, the onset of the superparamagnetic effect can be delayed by increasing the K$_u$ of the magnetic grain through addition of platinum which has a high orbital moment, and also by improving the crystalline perfection of the hexagonal close packed (HCP) cobalt grains.

Therefore, an optimal thin film magnetic recording medium for high density recording applications that can support high bit density will require low noise and high signal without adversely sacrificing PW$_{50}$, overwrite (OW) and total non-linear distortion (TNLD). Cobalt alloys which are currently used for optimization of certain of the above performance criteria typically include the addition of chromium (Cr), tantalum (Ta) and platinum (Pt), due to their ability to provide high Hc and high magnetic moment. Chromium is typically added in an amount greater than 10 atomic % to act as segregant to separate the cobalt alloy grains for noise reduction and for corrosion resistance. Other additives such as Ti, V, W, Mo, B and others are sometimes used. In all cases, the cobalt crystal structure must be hexagonal close-packed (HCP), and it is preferable to have the c-axis of the grains oriented in the film plane. This is accomplished by depositing a chromium film below the cobalt layer and arranging for the epitaxial growth of cobalt alloy grain above the chromium layer.

In order to describe the crystallography of the cobalt alloy and chromium, planes and directions in the crystal are denoted by generally accepted conventions, such as described in "Elements of X-ray Diffraction" by B. D. Cullity published by Addison-Wesley Publishing Co. Inc., herein incorporated by reference. It is typical to describe the crystallographic planes and directions in hexagonal crystals such as cobalt by a 4 indices notation called Miller-Bravais indices, while cubic structure crystals such as chromium are denoted by 3 indices notation called Miller indices.

Brackets, "< >" are used to describe crystallographic directions, while parenthesis "( )" are used to denote specific lanes. "{ }" are used to denote a class of planes which are crystallographically equivalent. For example with chromium with body-centered cubic (BCC) crystallographic structure, <001> direction is normal to a (001) plane. For a hexagonal crystal structure such as cobalt, the crystal surface with the most dense atomic packing is the (0001) plane and the direction normal to that plane is <0001> direction. The <0001> direction is often referred to as the c-axis as described earlier. The crystallographic directions and the surfaces for cobalt are shown in FIG. 1 and those for chromium are shown in FIG. 2.

The crystallographic orientation relationship that occurs between hexagonal cobalt film and BCC chromium film was originally reported by J. Daval & D. Randet in "Electron microscopy on High-coercive-force Co-Cr Composite Films" in IEEE Transaction on Magnetics, MAG-6, No. 4, (1970) p. 768–73. This work was preceded by work by J. P. Lazzari, I. Melnick and D. Randet in "Experimental studies using in-contact recording on chromium-cobalt films" in IEEE Transactions on Magnetics, Vol. MAG-5, No. 4, (1969) p. 955–59 where they reported that Hc of the cobalt film is increased by its deposition on top of a chromium underlayer.

The crystallographic orientation of chromium which promotes the cobalt c-axis to lie in the plane of the film is to arrange for chromium film to grow with <001> preferred growth, which means that {001} type planes of chromium lie in the plane of the film. It has been found that the atomic spacing of cobalt {11$\bar{2}$0} type planes matches reasonably well with the atomic spacing of a {001}$_{cr}$ plane as shown in FIG. 3 hereof. Lattice spacings for pure Cr ($a_o$=2.885 Å) and pure Co (c=4.069 Å, $a_o$=2.507 Å) are illustrated in FIG. 3. As seen in the Figure, the <0001> direction of cobalt is aligned with the <110> direction of the chromium lattice in the plane of epitaxy. In this direction, the Cr and Co lattices are closely matched and the mismatch is around 0.3%. Along the orthogonal direction (<01$\bar{1}$0>$_{Co}$); the mismatch with the Cr lattice is much larger at around 6.4%. In this orientation relationship between cobalt and chromium, the lattice match is close only in one direction. The same holds true for alloys of cobalt. It should also be pointed out that in the above orientation relationship between chromium and cobalt, there are two equally plausible configuration for the cobalt. The <0001>$_{Co}$ direction can lie along two orthogonal <110>$_{Cr}$ type directions. In fact when the chromium grains are large, two variants of cobalt grains which are oriented 90° to each other can form on the {001} surface of the chromium grains as described in "Effect of Microstructural Features on Media Noise in Longitudinal Recording Media" by T. Nolan et al. published in Journal of Applied Physics, 73(10), May 15, 1994 p. 5566–68.

A large variety of cobalt alloys have been used with a Cr undercoat. In its current industrial form, the Cr undercoat thickness is typically between 50 to 2000 Å, and it is deposited on a heated substrate. A high degree of epitaxy between the Cr and the magnetic layer is required in order to obtain high Hc and high hysteresis loop squareness. Typically, Cr grows with strong <100> orientation at high temperature, e.g. near or above approximately 2000° C. In the plane of the film, the epitaxial relationship is <110>$_{Cr}$// <0001>$_{Co}$, and {100}$_{Cr}$//{11$\bar{2}$0}$_{Co}$ where "//" denotes "parallel to". Alloying elements can be added to either chromium and cobalt or to both to attempt to match the lattice better. As mentioned before however, only one direction along the crystallographic direction can be very closely matched, while the other direction (orthogonal) will always be mismatched (e.g. over about 5%) in the above epitaxial orientation.

More recently, it has been shown by K. Hono, B. Wong, and D. E. Laughlin in the article "Crystallography of Co/Cr Bilayer Magnetic Thin Films" in Journal of Applied Physics 68(9) (1990) p.4734–40 that in-plane c-axis orientation may be achieved through other crystallographic relationship between Cr and Co lattice. The following lattice plane relationships have been proposed: (002)$_{Cr}$//(11$\bar{2}$0)$_{Co}$, (110)$_{Cr}$//(10$\bar{1}$1)$_{Co}$, (110)$_{Cr}$// (10$\bar{1}$0)$_{Co}$, and (211)$_{Cr}$//(10$\bar{1}$0)$_{Co}$. Generally, the addition of alloying elements into cobalt expands the lattice. For an alloy composition of CoCr$_{10}$Pt$_{18}$ for example, the lattice parameters are calculated to be Co=4.148 Å, $a_o$=2.556 Å. For this composition, the lattice mismatch for pure Cr and CoCr$_{10}$Pt$_{18}$ alloy for several combination of planes are listed in Table 1. The two mismatch numbers are two orthogonal directions in the plane of the epitaxy. It can be seen from table 1 that best epitaxial match can be obtained between (110)$_{Cr}$ and (10$\bar{1}$1)$_{Co}$ for a lattice mismatch of 0.2% and 2% respectively. However, in this case the c-axis of the cobalt is tilted 28° out of the plane. Another closely matched relationship is (211)$_{Cr}$ and (10$\bar{1}$0)$_{Co}$ for a lattice mismatch of 1.7% and 2% respectively. For other epitaxial relationships where the c-axis lies in the plane of the film, the difference in mismatch along the two directions is always greater.

TABLE 1

Compares lattice mismatch between CoCr$_{10}$Pt$_{18}$ alloy with pure Cr. Lattice mismatch for various planes of Cr and CoCr$_{10}$Pt$_{18}$

| Cr texture | CoCr$_{10}$Pt$_{18}$ texture | Mismatch | c-axis |
| --- | --- | --- | --- |
| (110) | (10$\bar{1}$1) | 0.2% and 2%) | 28° out of plane |
| (110) | (10$\bar{1}$0) | 1.7% and 11% | in plane |
| (200) | (11$\bar{2}$0) | 1.7% and 9% | in plane |
| (211) | (10$\bar{1}$0) | 1.7% and 2% | in plane |
| (111) | ($\bar{3}$120) | 1.7% and 4% | in plane |
| (221) | (10$\bar{1}$0) | 1.7% and 4% | in plane |
| (210) | | no good match in either direction | |

Since the original work by J. Daval & D. Randet on Co/Cr epitaxial film structure, there are many examples of work on both the cobalt and chromium underlayer alloys to improve the recording performance of the cobalt/chromium alloy structure. A variety of schemes have been proposed to improve the lattice matching between Cr or Cr alloys with the cobalt alloy, and hence improve the in-plane orientation of the cobalt, and improve Hc and other properties as previously noted. There are several approaches. The first involves alloy or deposition variations on a basic two layer structure, involving Cr and Co alloy films. The second approach involves use of multiple layers in the undercoat or a different material other than Cr or alloys of Cr in an attempt to affect the magnetic properties. Thirdly, multiple magnetic layers can be used to attempt a better in-plane orientation. These approaches are described in copending patent application Ser. No. 08/984,753, now U.S. Pat. No. 6,150,015, which application is assigned to the assignee of the present invention and which application is incorporated by reference herein.

In the prior art, a common theme is that lattice matching between Co alloy and Cr is claimed as the key contributor to high Hc and lower noise. Particularly with respect to double magnetic layers using CoCrTa first layer and CoCrPt second layer, it is claimed that CoCrTa is better lattice matched to Cr, whether the orientation relationship claimed is (200)$_{Cr}$//(11$\bar{2}$0)$_{Co}$, (110)$_{Cr}$//(10$\bar{1}$0)$_{Co}$ or sometimes even (110)$_{Cr}$//(10$\bar{1}$1)$_{Co}$. However, as shown earlier in table 1, a perfect lattice match in all directions is not possible. Furthermore, perfect or even good epitaxy in actual production machines is also difficult to achieve. One reason is that residual gases in the system which are often water vapor and oxygen which can be produced from the water vapor, can affect the interface between the Cr and the Co alloy layer and cause loss or partial loss of epitaxy.

Therefore, under deposition conditions that are not entirely perfect in terms of vacuum conditions and at high rate of deposition typically used in a commercial application, obtaining good epitaxy between Cr and Co-alloy layer is difficult to achieve. Hence c-axis in-plane orientation of the hexagonal cobalt film is not necessarily achieved, leading to lower Hc than is possible for a given Pt content of CoCrPt based alloy, and also reduced squareness. In addition, the grain size may not be uniform and the grains themselves may not have the proper crystalline perfection for high anisotropy constant $K_u$. These factors lead to films having less than desirable parametric performance. Even under the best conditions where epitaxy is favored, there is still inherent mismatch between hexagonal cobalt and cubic chrome lattice. Lack of good epitaxy and subsequent poor growth of the magnetic layer can result in formation of a large amount of imperfections such as dislocations, stacking faults and other irregularities in the crystalline structure which will reduce the Hc potential for a given alloy composition and Pt content.

If the magnetic crystallites contain a high amount of imperfections, the uniaxial crystal anisotropy energy, $K_u$, of the media will decrease drastically. When a CoCrTa layer is inserted between the CoCrPt based alloy and Cr according to the prior art, it apparently helps the perfection of the CoCrPt based alloy to some extent, but the prior art still has to resort to high Pt containing alloy to raise the Hc. High platinum costs more, reduces the magnetization Ms of the film and hence requires a thicker film to obtain a given magnetic remanence-thickness product (MrT), and also causes more lattice imperfections in the cobalt HCP structure. At above 10% platinum content, there is increased chance of producing FCC (face-centered cubic) crystal structure which will reduce the Ku value as compared with the HCP structure by more than an order of magnitude. Hence adding an excessive amount of Pt in an attempt to raise Hc will defeat the purpose of the benefit of Pt.

A further problem in advanced media is thermal stability i.e. the superparamagnetic effect described earlier. As the volume of magnetic material decreases by virtue of both the decrease in layer thickness and decrease in grain size, the thermal energy of the magnetic particles may exceed the magnetic energy, such that the magnetic grains may switch randomly in an unacceptably short time frame, causing loss of data. As can be seen from the foregoing discussion, as density increases, necessitating smaller grain size for noise considerations, maintaining high thermal stability is difficult.

As is known, the thermal stability is related to the value of KuV/kT, where Ku is the uniaxial crystal anisotropy energy, V is the volume of the magnetic switching unit, k is the Boltzmann constant and T is the temperature of operation of the media. A larger value of this quantity indicates a greater thermal stability. The desire to reduce grain size to reduce noise thereby reduces the value of V, leading to the decrease in thermal stability noted above. The value of Ku is related to the alloy composition and the perfection of the crystal structure of the HCP alloy. In practice, Ku never achieves its full theoretical value because of the presence of crystalline defects, many of which are geometrically necessary to accommodate interfacial lattice misfit. There is always some mismatch which, although may be made reasonably small in one direction cannot be made sufficiently small in both directions. The difficulty arises in growing a cobalt HCP structure on a BCC chrome underlayer in that misfit dislocations or stacking faults will occur as a mechanism to relieve strain.

While the prior art solution of using an intermediate layer between the underlayer and the magnetic layer(s) absorbs some of the defects, and essentially provides a transition between the BCC and the HCP structures, there is still typically sufficient mismatch between the intermediate layer and the magnetic layer such that the crystal imperfections are significant, resulting in a lowered value of Ku and hence decreased thermal stability.

What is needed is a thin film recording media having a high thermal stability while achieving low noise. The media should be capable of being manufactured in a cost effective manner in a high volume production environment.

SUMMARY OF THE INVENTION

An improved thin film recording media structure is described. One embodiment of the invention comprises the use of an underlayer such as chrome or chrome alloy and an intermediate layer that forms bi-crystals on the underlayer. In this way, the underlayer can be grown to a sufficient thickness so as to form a desirable texture, such as the (200) texture. The intermediate layer forms bi-crystals on each of the grains of the underlayer, thereby providing a small grained template for the subsequent layer.

In a further aspect of the present invention, two underlayers are used. The first underlayer is designed to match the underlayer and will have some mismatch in lattice parameter from the underlayer. Preferably, the first intermediate layer is the above-described layer forming bi-crystals. The second intermediate layer is designed in particular to match to the ultimate magnetic layer. However, the lattice match of the second intermediate layer is reasonably close to that of the first intermediate layer. While some defects in crystalline structure may be present at the interface of the first and second intermediate layer, the number of such defects is reduced as compared to the number of defects between the first intermediate layer and the underlayer. Therefore, the second intermediate layer can grow relatively defect free to present a high quality template for growth of the magnetic layer.

After deposition of the first and second intermediate layers, a magnetic layer is deposited on the second underlayer. Because the second underlayer has been chosen to match the magnetic layer, there are relatively few defects, resulting in a high quality structure in the magnetic layer and hence increased Ku. In preferred embodiments, one or both of the intermediate layers is non-magnetic. In any event, even if such layers are magnetic their thickness is generally small so that the contribution of these layers to the magnetic moment is small. In embodiments of the present invention, a single magnetic layer may be used, or multiple magnetic layers, including so called laminated structures such as those described in the background section, may be used.

In a further embodiment of the present invention, a layer such as the first intermediate layer described above may be used as a spacer type layer in a laminated magnetic layer structure.

Additional embodiments and other features and advantages of the present invention will become apparent from the detailed description, figures and claims which follow.

DETAILED DESCRIPTION

In the following description, numerous specific details are set forth such as specific substrates, layers, materials, alloys operating parameters, dimensions, etc. It will be appreciated, however, that these specific details need not be employed to practice the present invention. In other instances, well known methods and apparatuses are not described in detail in order not to obscure unnecessarily the present invention. Moreover, although the theory upon which the invention is believed to operate is described in detail, the present invention including intermediate layers as described herein has been found to be beneficial when practiced as described herein and is not intended to be limited by theory.

Figure 1:
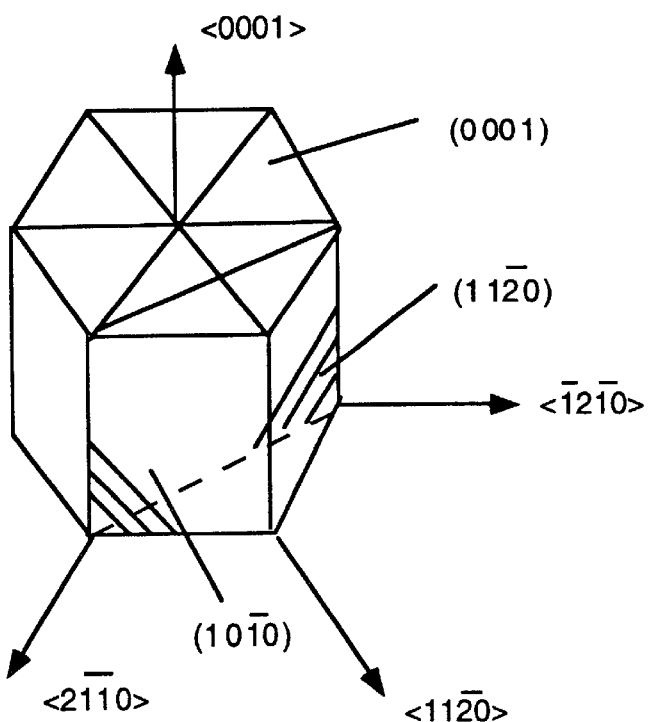
FIG. 1 is a crystallographic representation of cobalt with some of the planes and directions indicated.
Figure 2:
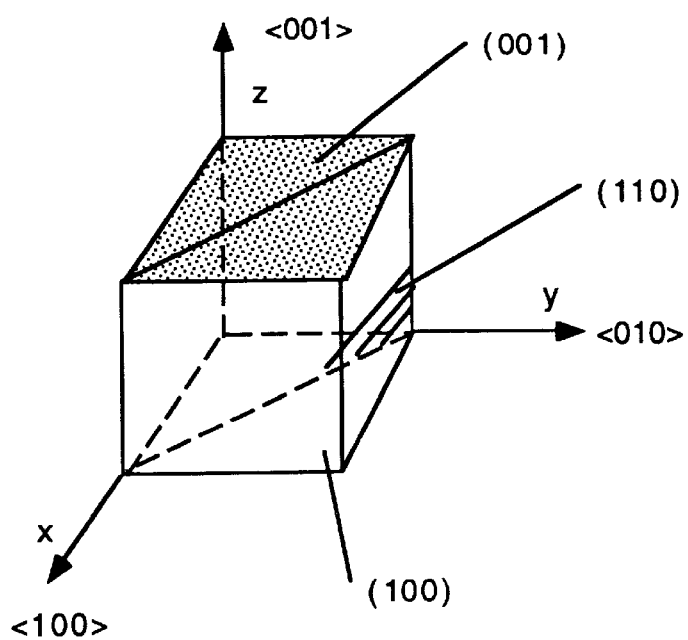
FIG. 2 is a crystallographic representation of chromium with some of the planes and directions indicated.
Figure 3:
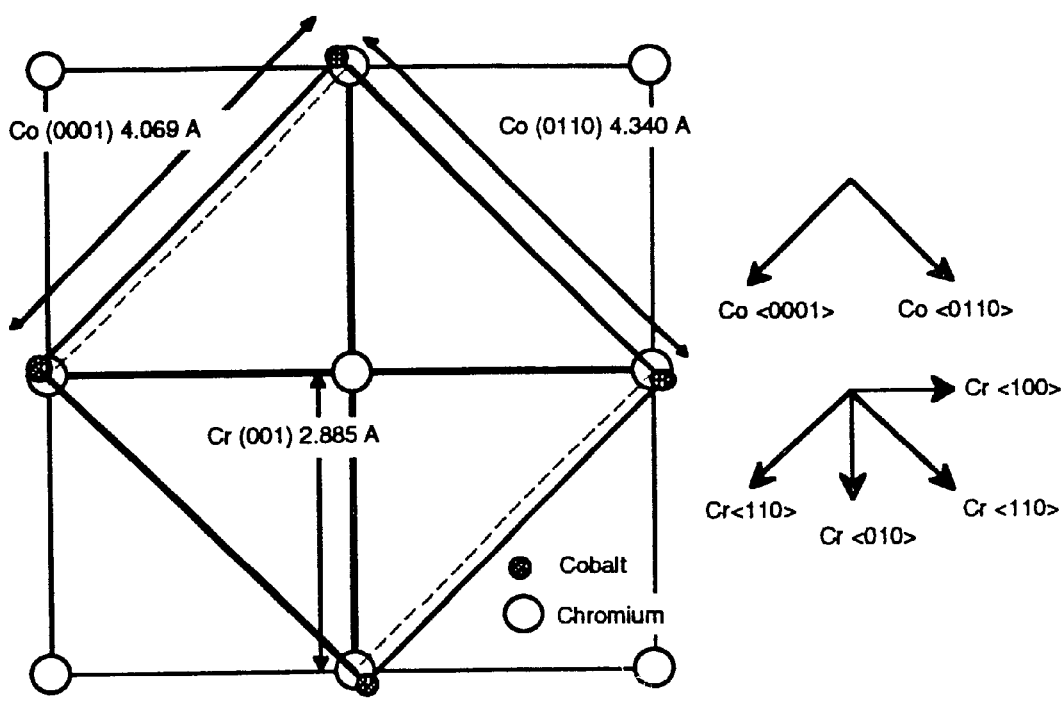
FIG. 3 is a illustration of lattice matching between $(200)_{Cr}$ plane and $(11\bar{2}0)_{Co}$ plane.
Figure 4:
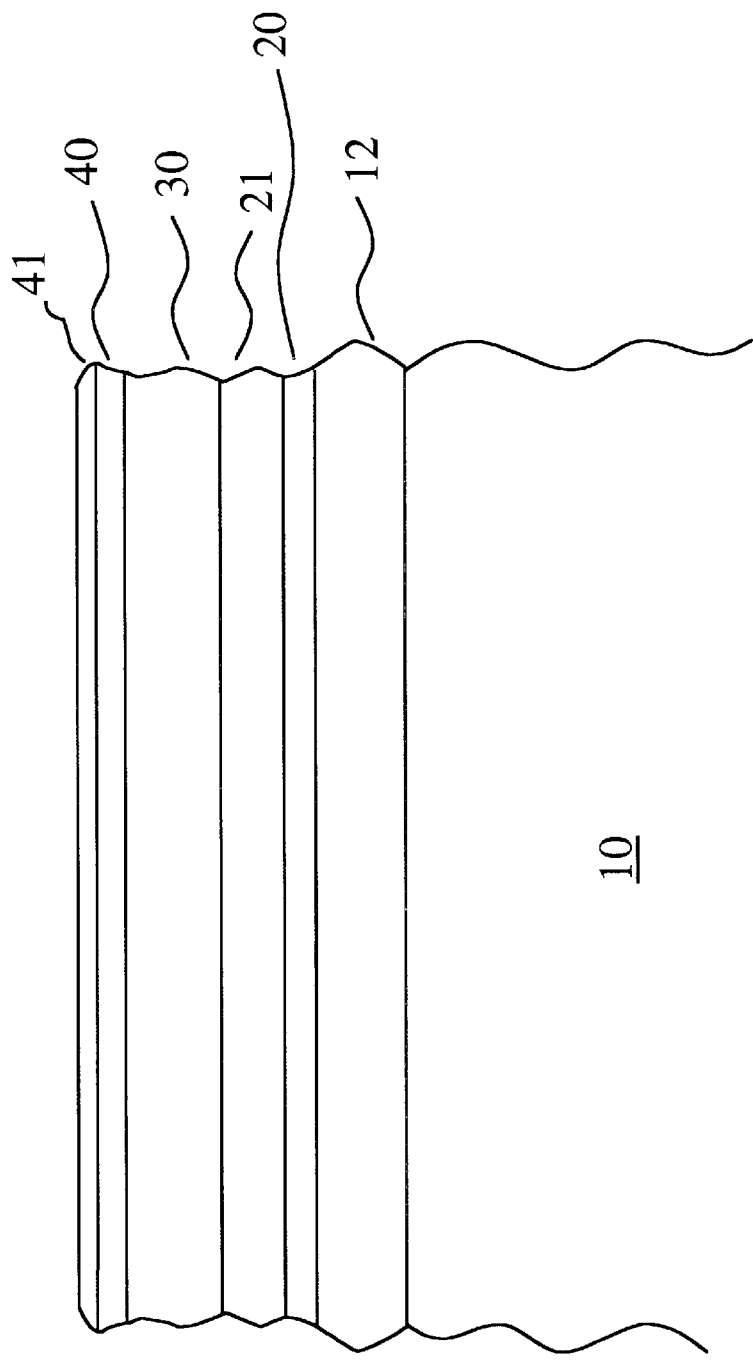
FIG. 4 shows a cross sectional schematic representation of an embodiment of the present invention.

Referring to FIG. 4, an embodiment of the present invention is illustrated. Embodiments of the present invention include the one or more layers described below which may be formed upon substrate 10. Additional layers not shown or described may also be present above, below or between the layers described herein. Substrate 10 in some embodiments may be an Al substrate upon which one or more other layers, such as various Ni alloys, including NiP, NiAl, or others have been formed. Alternatively, substrate 10 may comprise alternative substrate materials such as glass or glass ceramic which likewise may additionally have one or more additional layers formed thereon. In a preferred embodiment, an underlayer 12 is formed on the substrate 10. Underlayer 12 may comprise Cr or a Cr alloy such as CrV, CrMo, or others and may have, for example a BCC structure with a (002) orientation (i.e., (002) face parallel to the plane of the film). In preferred embodiments underlayer 12 may comprise CrMols with a thickness in the range of approximately 50–2000 Å, and more preferably approximately 100–500 Å, although other compositions and thicknesses outside these ranges may also be used.

In preferred embodiments of the present invention, intermediate layer 20 is formed over underlayer 12. In a preferred embodiment, the intermediate layer 20 is an HCP material that will form HCP crystals grown epitaxially on the underlayer 12. For example, intermediate layer 20 may comprise $CoCr_xTa_y$. Typically, the value of x may be in the range of approximately 10–45 atomic % and the value of y may be in the range of approximately 0–10 atomic % and more preferably in the range of 3–8%, although compositions outside these ranges may be used. Intermediate layer 20 is designed to provide a reasonable match but with a desirable degree of mismatch, as explained below, to the BCC structure of underlayer 12, while at the same time providing an HCP template upon which subsequent layers may grow. Preferably intermediate layer 20 (as well as intermediate layer 21 and magnetic layer 30 described below) have a $11\bar{2}0$ orientation. The Ta concentration may be varied to adjust the lattice parameter of the first intermediate layer 20 to achieve a desired degree of match to underlayer 12. In addition, the Ta increases the stacking fault energy thereby minimizing the number of stacking faults or misfit dislocations in the first intermediate layer 20.

In a preferred embodiment, intermediate layer 20 is deposited at a relatively slow deposition rate (e.g. preferably less than or equal to approximately 5 Å/second and more preferably less than or equal to approximately 1 Å/second), and under a sufficiently high substrate temperature (e.g. equal to or greater than approximately 200° C.) or a combination of substrate temperature and substrate bias to promote epitaxial growth, even in light of the mismatch between underlayer 12 and intermediate layer 20. Additionally, or alternatively, RF sputtering may be used. The use of one or more of high temperature, substrate bias, and RF sputtering helps promote mobility of the sputtered species, which leads to epitaxial growth of intermediate layer 20. Moreover, under such conditions, and with a sufficient degree of mismatch, intermediate layer 20 will form bi-crystals on underlayer 12.

The formation of bi-crystals is beneficial because it is difficult to manufacturably form very small grains of uniform size and of a desired texture, such as (200) in the underlayer. With the present invention, the underlayer 12 may be formed of a sufficient thickness and grain size so as to reproducibly produce the desired texture. Preferably, the thickness, and consequently grain size of underlayer 12 is still kept to the minimum needed to reproducibly produce the desired texture. But in any event, the formation of bi-crystals in intermediate layer 20 provides for an even smaller grained template than the grains of the underlayer 12, thus reducing noise.

As mentioned above, it is desirable for there to be some mismatch in lattice parameter, for example, 5% or more, in at least one direction between underlayer 12 and intermediate layer 20. This mismatch makes it energetically less favorable for intermediate layer 20 to form a single crystallite over large distances since the mismatch adds up. Instead, bi-crystals are formed in intermediate layer 20 so that the grain size in intermediate layer 20 is less than the grain size would be if there were little mismatch. With small grain size, media noise is reduced. In preferred embodiments, the mismatch is sufficient to cause formation of bi-crystals in intermediate layer 20, but preferably is not any greater than needed to do so, so that intermediate layer 20 forms with reasonable quality. Additionally, as will be discussed below, in embodiments having two intermediate layers, it is desirable that the first intermediate layer, such as intermediate layer 20, absorb much of the mismatch between the BCC structure of underlayer 12 and the HCP structure of the magnetic layer to be formed. In this way, the second intermediate layer can present a high quality surface upon which the magnetic layer can grow with a very close lattice match.

Figure 5:
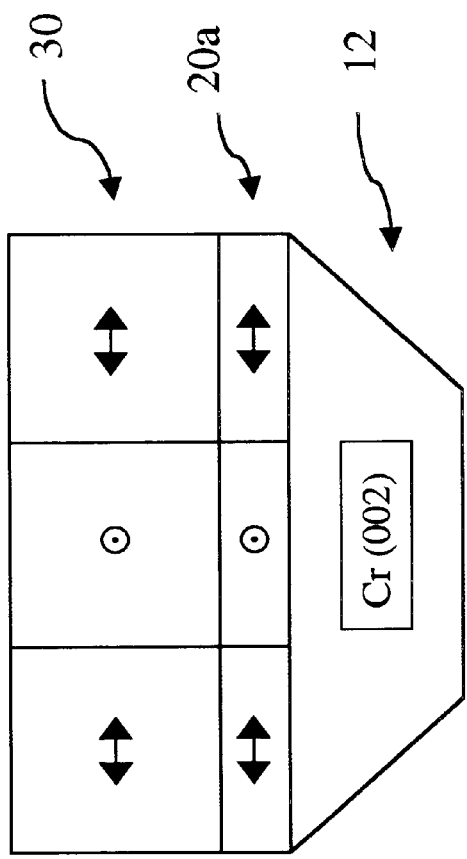
FIG. 5 shows a cross sectional schematic representation of a media structure according to an embodiment of the present invention.
Figure 6:
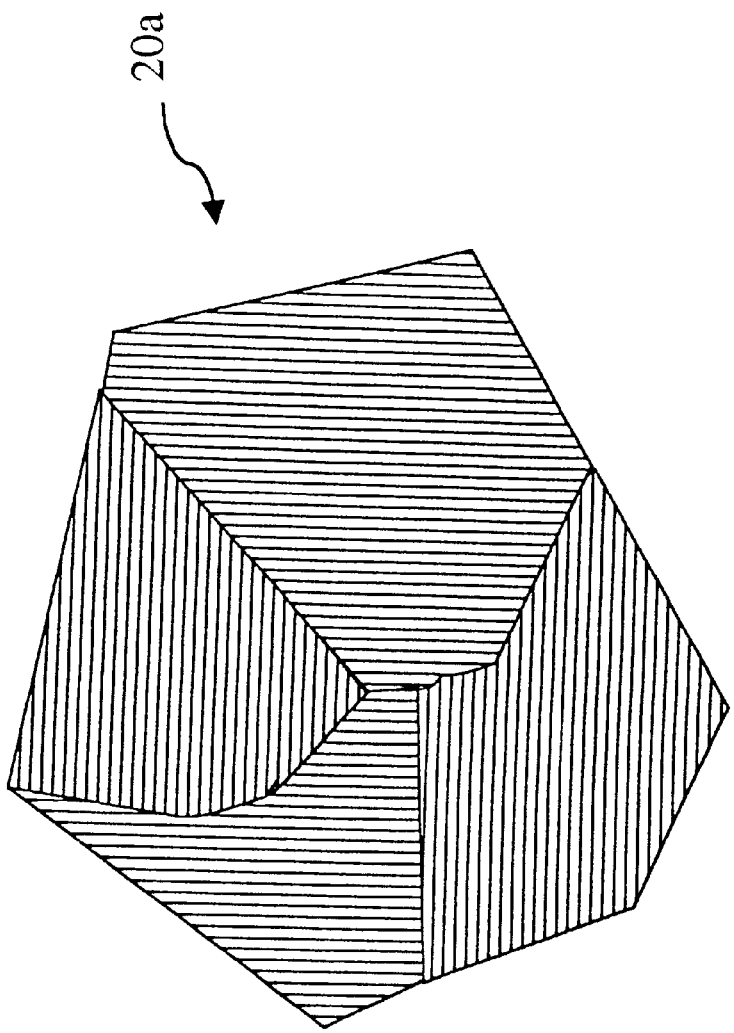
FIG. 6 shows a top view of the crystal structure of an intermediate layer of the embodiment of FIG. 5.

FIG. 5 shows a cross sectional view of an embodiment of the invention wherein a single intermediate layer 20 is formed over underlayer 12. In FIG. 5, a single crystallite of underlayer 12 is shown. Multiple crystallites of intermediate layer 20 form on the single crystal of underlayer 12. As can be seen in FIG. 6, which is a top view of the structure shown in FIG. 5 after formation of intermediate layer 20 and before formation of magnetic layer 30, the bi-crystals are separated by large angle (e.g. approximately 90 degrees) grain boundaries. In this structure, a higher concentration of Cr segregates to these grain boundaries. This segregation imparts magnetic separation to the bi-crystals thereby preventing exchange interaction and reducing to a degree the magnetostatic interaction between the bi-crystals. The formation of bi-crystals helps to reduce media noise as described above. As mentioned, it will be desirable to keep the grain size of the Cr as small as possible. However, by virtue of the reduction of noise gained by formation of small grained bi-crystals, the underlayer 12 can be formed with grains of a sufficient size to uniformly and manufacturably produce the desired texture in underlayer 12. In embodiments where the Cr grains are sufficiently small for the intended application of the media being formed, the formation of bi-crystals in intermediate layer 20 is not necessary.

Referring again to FIG. 4, in a preferred embodiment of the present invention, a second intermediate layer 21 is formed over first intermediate layer 20. In a preferred embodiment, the second intermediate layer comprises and HCP alloy such as $CoCr_{x1}Ta_{y1}$. The second intermediate layer 21 is designed to have an extremely close match to the subsequently deposited magnetic layer 30. In a preferred embodiment, the first intermediate layer 20 may be a layer such as that described in conjunction in FIG. 5 and 6, thereby having reduced noise. However, it will be understood that use of more than one underlayer has advantages distinct from the reduction in noise achieved by a layer such as 20 having bi-crystals, as will be described in more detail below.

Because in preferred embodiments the first intermediate layer is selected to provide a desired mismatch, but still have a sufficiently close match to underlayer 12, while the second intermediate layer is selected to have a good match to magnetic layer 30, the two layers typically have different compositions from each other. Therefore, using, for example, a first intermediate layer 20 $CoCr_xTa_y$ and a second intermediate layer 21 $CoCr_{x1}Ta_{y1}$, typically at least one of x1 and y1 are different from x and y, respectively. In general, the values of x and x1 are in the range of approximately 10–45 atomic %, and the values of y and y1 are in the range of approximately 0–10 atomic %, although compositions outside these ranges may also be used. The composition used, as well as the addition of other components may be varied in accordance with the teachings herein.

The composition of the layers is adjusted to achieve the desired crystal structure, lattice parameters, and magnetic properties of the layers and the effects of varying one or more components affects these properties in a manner understood by one of skill in the art. In general, for example, the amount of Cr can be varied to make the film magnetic, slightly magnetic, or nonmagnetic as desired. The amount of Ta is typically used for suppression of dislocations and stacking faults, as discussed briefly below, and to adjust the lattice parameter. For example, with respect to the latter, in the first intermediate layer 20, the introduction of some Ta causes some desired mismatch in the $<10\bar{1}1>$ direction of the first intermediate layer 20 and the <110> direction of underlayer 12, and provides a better match to the subsequent second intermediate layer 21. The concentration of Ta in the second intermediate layer is designed to provide a good lattice match of the HCP intermediate layer 21 to the HCP magnetic layer 30, which is typically a CoPt based alloy. Other materials may also be present in either intermediate layer. For example, it may be desirable to use one or more of Pt, Pd, Ni, Nb, W, and B, typically in second intermediate layer 21 to provide a good lattice match to magnetic layer 30. The concentration of Ta is also varied to adjust the stacking fault energy. For example, a greater stacking fault energy may be desirable to suppress the occurrence of stacking faults and dislocations in a given layer. Furthermore, with respect to any of the materials added to the layers, well known chemical effects, such as the "wetting" or "non-wetting" properties of the materials may be considered.

Figure 7:
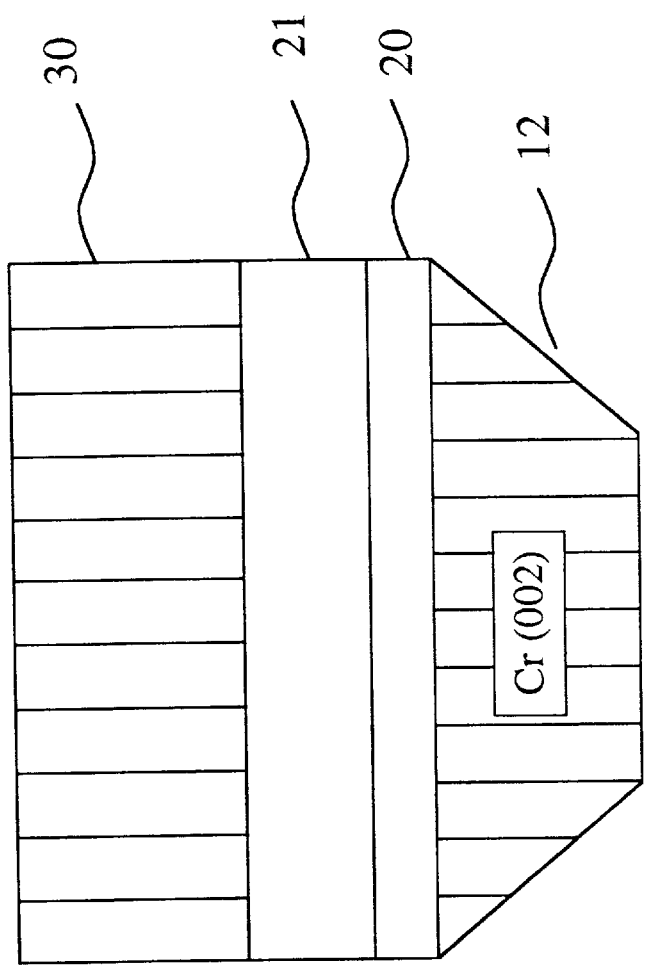
FIG. 7 shows a cross sectional schematic representation of the differing lattice plane spacing between an underlayer and a magnetic layer.

Referring now to FIG. 7, a cross sectional view of an embodiment of the present invention is shown schematically. As in previous embodiments, a single grain of underlayer 12, which may be, e.g., an (002) BCC Cr or Cr alloy material, is shown. Disposed on underlayer 12 is first intermediate layer 20, intermediate layer 21 and then magnetic layer 30. As shown, the lattice spacing in underlayer 12 is different from that of magnetic layer 30. The underlayers 20 and 21 are used to "absorb" this difference. First intermediate layer 20 will have a number of crystallographic defects and strain present, (not shown) primarily due to the fact that in the preferred embodiment intermediate layer 20 comprises an HCP structure with some lattice mismatch to BCC underlayer 12. Next, disposed on first intermediate layer 20 is second intermediate layer 21. Near the interface between intermediate layer 20 and intermediate layer 21, some defects from the mismatch with underlayer 12 have propagated through the relatively thin intermediate layer 20. In addition some strain is present due to the different compositions of layers 20 and 21 which lead to some lattice mismatch.

However, because there is a reasonably good match between these two intermediate layers, and because intermediate layer 20 has established an HCP structure, the extent of such crystallographic defects is lessened. The vast majority of any remaining defects are essentially absorbed in layer 21, such that second intermediate layer 21 presents a substantially defect-free template upon which magnetic layer 30 may grow. Moreover, because intermediate layer 21 is tailored to match magnetic layer 30 in lattice parameter and crystal structure and orientation, magnetic layer 30 can begin to grow on second intermediate layer 21 in a substantially defect-free manner or in any event with greatly reduced crystal defects. Thus, in the present invention, the mismatch between an underlying Cr layer such as underlayer 12 and the ultimate magnetic layer such as magnetic layer 30 can be absorbed through the use of two intermediate layers, such that the magnetic layer 30 can be nearly defect-free. Because of the crystalline quality of the magnetic layer, the value of Ku for such layer may be made closer to its theoretical value of a perfect lattice crystallite for the particular alloy in use. For the reasons discussed previously, the high value of Ku results in a more thermally stable media. Because the media has such a high quality crystalline structure, the film is more thermally stable than a comparable film of the same alloy having the same grain size.

Figure 8:
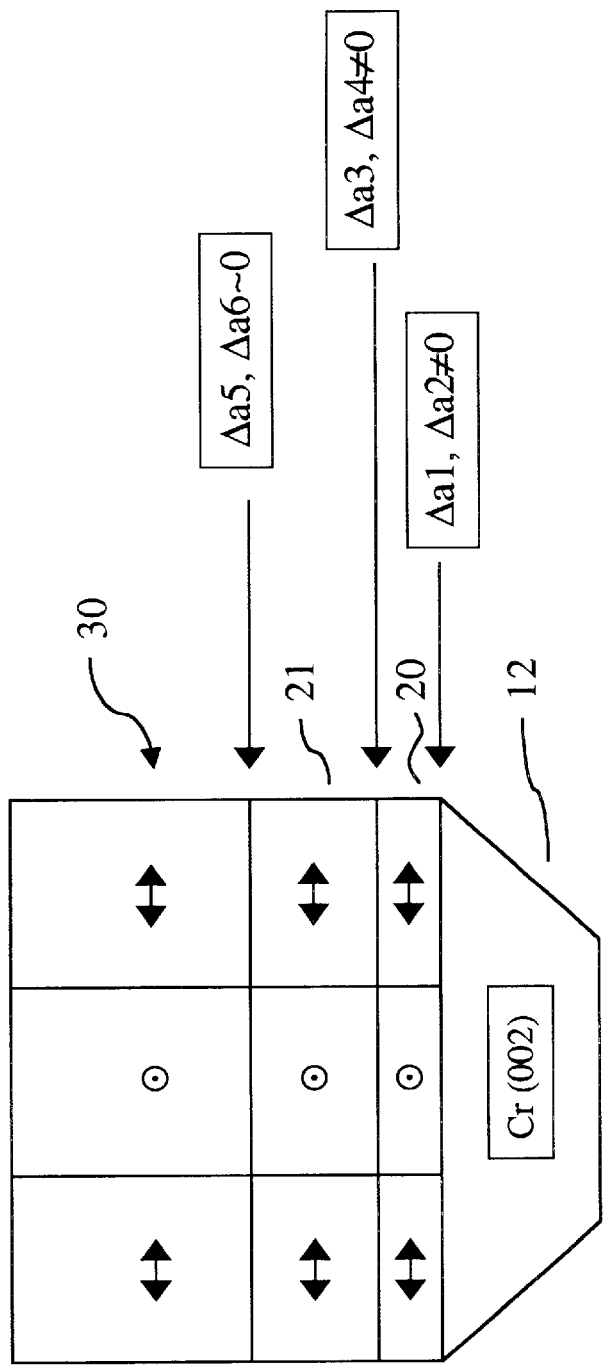
FIG. 8 illustrates interfacial misfit strain between various layers in an embodiment of the present invention.

FIG. 8 represents the interfacial misfit strain in the present invention. In FIG. 8, $\Delta a1$ and $\Delta a2$ represent the difference in the two orthogonal lattice parameters in the plane of the film between underlayer 12 and first intermediate layer 20, while $\Delta a3$ and $\Delta a4$ represent the difference in lattice parameters between first intermediate layer 20 and second intermediate layer 21, and $\Delta a5$ and $\Delta a6$ represent the difference in lattice parameters between second intermediate layer 21 and magnetic layer 30. As shown, there is some strain between underlayer 12 and first intermediate layer 20, as well as between first intermediate layer 20 and second intermediate layer 21. However, the misfit strain between second intermediate layer 21 and magnetic layer 30 is preferably virtually zero but in any event reduced compared with a single intermediate layer.

It will be appreciated that a variety of compositions and thicknesses may be used for the intermediate layer or layers of the present invention. The composition will depend upon the particular underlayer 12 and the magnetic layer 30 used.

In either or both of the intermediate layers 20 and 21, the amount of Cr (i.e. value of x, x1) may be adjusted to make the layers nonmagnetic or only slightly magnetic. In general, because these layers contain various crystal defects as described above (as compared to magnetic layer 30) and are not optimized for magnetic performance in the manner that magnetic layer 30 is, it is desirable that these layers do not contribute significantly to the magnetic moment. One measure of this is the value of MrT, where Mr is the magnetic remanence and T is the thickness of the layer. It is desirable that, for example, the intermediate layers 20 and 21 contribute no more than 20% of the overall MrT of the combined layers 20, 21 and 30, preferably no more than 10%, and most preferably 5% or less of the total MrT value. It will be appreciated then that this may be accomplished by some combination of making the layers less magnetic by having a higher Cr concentration (or other transition element addition), and limiting the thickness of these layers. Thus, one can increase the thickness as necessary to absorb defects so long as the layer is non or only slightly magnetic. Alternatively, one may use magnetic layers for one or both of layer 20 and 21 so long as the thickness is not too great in comparison to magnetic layer 30.

In one embodiment of the present invention, a $CrMo_{15}$ underlayer is utilized, having a thickness of approximately 150 Å. The magnetic layer consists of a $CoCr_{19} Pt_{8.5}Ta_4$ alloy varying from approximately 100–200 Å in thickness. A first intermediate layer may comprise $CoCr_{18}Ta_4$, and a second intermediate layer may comprise $CoCr_{15}Ta_7$. Both intermediate layers are HCP structures, the first intermediate layer having a thickness of approximately 15 Å and the second having a thickness of approximately 20 Å. Because the first intermediate layer matches well to the Cr, the first intermediate layer forms with a good crystal structure at a wide range of process conditions such as underlayer thickness. As mentioned previously, it is desirable to limit the thickness of the underlayer to limit the grain size. However, it is generally not desirable to have too small a grain size as it is difficult to maintain the desired orientation. Thus, the ability of the first intermediate layer to match the underlayer with only a desired degree of mismatch is extremely helpful with respect to process flexibility over a range of underlayer thicknesses.

Moreover, because a second intermediate layer having a composition of, e.g., $CoCr_{15}Ta_7$ is used, the coercivity is higher than in the case of the single $CoCr_{18}Ta_4$ intermediate layer even though the media using the dual interlayer has equivalent manufacturability as the single $CoCr_{18}Ta_4$ interlayer.

Figure 9:
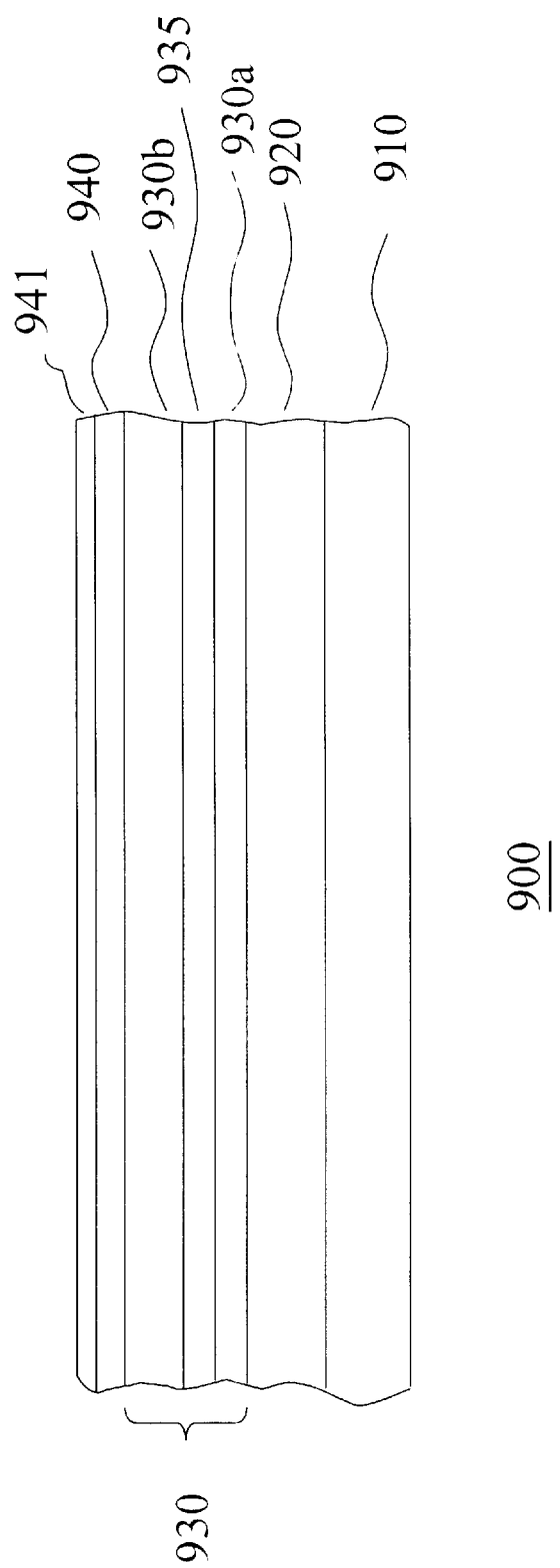
FIG. 9 shows a laminated media structure according to the present invention.

FIG. 9 illustrates a further embodiment of the present invention. Media according to the embodiment illustrated in FIG. 9 may comprise a substrate 900 which is generally similar to substrate 10 of FIG. 4, underlayer 910, which may be one of the underlayers such as those described for underlayer 12 of FIG. 4, intermediate layer or layers 920, which may comprise one or both intermediate layers according to the present invention such as intermediate layers 20 and 21 illustrated in FIG. 4. In the embodiment shown in FIG. 9, a laminated magnetic layer 930 is formed of two sublayers 930*a* and 930*b*, separated by spacer layer 935.

As mentioned earlier, it is known to use one or more magnetic layers separated by a nonmagnetic spacer to provide portions of a magnetic layer which are exchange decoupled. In U.S. Pat. No. 5,051,288, a Cr, CrMo or CrV spacer layer is used as an interlayer. However, one problem with prior art spacer layers in laminated structures is that the crystal structure is typically BCC. This may prevent the subsequent portion of the magnetic layer such as portion 930*b* from forming with a high quality crystal structure, thereby resulting in a lower Ku than is theoretically possible for the alloy.

In the present invention, spacer layer 935 comprises a HCP layer similar to the intermediate layers of the present invention. Preferably, spacer layer 935 is nonmagnetic or only slightly magnetic i.e., the Cr concentration is sufficiently high such that the two portions of the magnetic layer 930*a* and 1230*b* are not exchange coupled. Spacer layer 935 may comprise an alloy such as $CoCr_xTa_y$, with x and y preferably within the ranges for x and $X_1$ and y and $y_1$, respectively, described earlier. The spacer layer 935 be deposited to a thickness of, for example 5–100 Å and more preferably in the range of approximately 5–25 Å. Additionally, the concentration of Ta may be varied to achieve matching with one or both portions of the magnetic layers 930*a* and 930*b*. It will be appreciated that layers 930*a* and 930*b* may be formed to any desired thickness, and may be any desired composition. After deposition of the second portion of the magnetic layer 930*b*, an overcoat, such as a carbon overcoat layer 940 followed by lubrication 941 may be formed on the media. Typically, only one spacer layer will be needed as the magnetic portions 930*a* and 930*b* are generally similar in structure to one another. Of course, if desired a plurality of spacer layers according to the present invention may be used, with the first tailored to the underlying magnetic layer, and the last tailored to the overlying magnetic layer. If desired, each magnetic layer may comprise a plurality of sublayers of differing composition for example. Moreover, there may be multiple sets of magnetic layers and spacers, with one or more of the spacers according to the present invention.

While the invention has been described with respect to specific embodiments thereof, those skilled in the art will recognize that changes can be made in form and detail without departing from the spirit and scope of the invention. Different compositions and different crystal structures may be used depending upon the particular underlayers and magnetic layers used. As an example, it may be desirable that the first intermediate layer have the same type structure as the underlayer (e.g. BCC) but be composed such that the second intermediate layer has a closer match to it than the second intermediate layer would have to the underlayer. Different types of crystal structure may be used from those described herein. For example, the underlayer may have a B2 crystal structure (e.g. NiAl). Moreover, depending upon the particular matches of the structure, layer thicknesses can be adjusted as necessary to absorb defects in the crystalline structure, such that substantially defect-free surface is presented to the magnetic layer. Additional layers may be used above, below, or between those disclosed herein. Although specific embodiments have been shown, aspects of any embodiment can be used in others. The embodiments described herein, as well as embodiments having changes in form and detail as may be readily apparent to one of skill in the art upon reading the present disclosure are understood to come within the scope of the present invention.

What is claimed is:

1. A structure comprising:
    a substrate;
    an underlayer disposed over the substrate;
    a first intermediate layer disposed over the underlayer, said first intermediate layer having a hcp structure;
    a second intermediate layer disposed directly over the first intermediate layer, said second intermediate layer having a hcp structure; and
    a magnetic layer disposed over the second intermediate layer, wherein said first and second intermediate layers are substantially non-magnetic.

2. The structure as described in claim 1 wherein said underlayer is of a first crystal structure different from a hcp structure.

3. The structure as described in claim 1 wherein a lattice mismatch between said magnetic layer and said second intermediate layer is less than one or both of: a lattice mismatch between said magnetic layer and said first intermediate layer; and, a lattice mismatch between said magnetic layer and said underlayer.

4. A structure comprising:

a substrate;

an underlayer disposed over the substrate;

a first intermediate layer disposed over the underlayer, said first intermediate layer having a hcp structure;

a second intermediate layer disposed over the first intermediate layer, said second intermediate layer having a hcp structure; and a magnetic layer disposed over the second intermediate layer, wherein said first and second intermediate layers are substantially non-magnetic, wherein a lattice mismatch between said magnetic layer and said second intermediate layer is less than both a lattice mismatch between said magnetic layer and said first intermediate layer and a lattice mismatch between said magnetic layer and said underlayer.

5. A structure comprising:

a substrate;

an underlayer disposed over the substrate;

a first intermediate layer disposed over the underlayer;

a second intermediate layer disposed over the first intermediate layer; and a magnetic layer disposed over the second intermediate layer, wherein said underlayer comprises chrome, said first intermediate layer comprises $CoCr_xTa_y$, said second intermediate layer comprises $CoCr_{x1}Ta_{y1}$, said magnetic layer comprises CoPt, and wherein at least one of x and y is different from x1 and y1, respectively, and wherein said structure has an MrT value, and wherein said first intermediate layer and said second intermediate layer contribute no more than 20% of said MrT value.

6. The structure as described in claim 5 wherein said first intermediate layer has a thickness in the range of approximately 5–50 Å, said second intermediate layer has a thickness in the range of 5–100 Å, and said magnetic layer has a thickness in the range of 20–300 Å.

7. The structure as described in claim 5 wherein said first intermediate layer has a thickness in the range of approximately 5–20 Å, said second intermediate layer has a thickness in the range of 20–80 Å, and said magnetic layer has a thickness in the range of 20–200 Å.

8. A structure comprising:

a substrate;

an underlayer disposed over the substrate;

a first intermediate layer disposed over the underlayer, the first intermediate layer having a hcp structure;

a second intermediate layer disposed directly over the first intermediate layer, the second intermediate layer having a hcp structure; and a magnetic layer disposed over the second intermediate layer, wherein both of said first intermediate layer and said second intermediate layer are not magnetic.

9. A structure comprising:

a substrate;

an underlayer disposed over the substrate;

a first intermediate layer disposed over the underlayer, the first intermediate layer having a hcp structure;

a second intermediate layer disposed directly over the first intermediate layer, the second intermediate layer having a hcp structure; and a magnetic layer disposed over the second intermediate layer, wherein said structure has an MrT value, and wherein said first intermediate layer and said second intermediate layer contribute no more than 20% of said MrT value.

10. The structure as described in claim 9 wherein said first intermediate layer and said second intermediate layer contribute no more than 10% of said MrT value.

11. The structure as described in claim 9 wherein said first intermediate layer and said second intermediate layer contribute no more than 5% of said MrT value.

12. A disk drive comprising the structure described in claim 1.

13. A method comprising:

providing a substrate;

depositing an underlayer over the substrate;

depositing a first intermediate layer over the underlayer, the first intermediate layer having a hcp structure;

depositing a second intermediate layer directly over the first intermediate layer, the second intermediate layer having a hcp structure; and depositing a magnetic layer over the second intermediate layer, wherein said first and second intermediate layers are substantially non-magnetic.

14. The method as described in claim 13 wherein said underlayer is of a first crystal structure different from a hcp structure.

15. The method as described in claim 13 wherein a lattice mismatch between said magnetic layer and said second intermediate layer is less than one or both of: a lattice mismatch between said magnetic layer and said first intermediate layer; and, a lattice mismatch between said magnetic layer and said underlayer.

16. A method comprising:

providing a substrate;

depositing an underlayer over the substrate;

depositing a first intermediate layer over the underlayer, the first intermediate layer having a hcp structure;

depositing a second intermediate layer over the first intermediate layer, the second intermediate layer having a hcp structure; and depositing a magnetic layer over the second intermediate layer, wherein said first and second intermediate layers are substantially non-magnetic, wherein a lattice mismatch between said magnetic layer and said second intermediate layer is less than both a lattice mismatch between said magnetic layer and said first intermediate layer and a lattice mismatch between said magnetic layer and said underlayer.

17. A method comprising:

providing a substrate;

depositing an underlayer over the substrate;

depositing a first intermediate layer over the underlayer;

depositing a second intermediate layer over the first intermediate layer; and depositing a magnetic layer over the second intermediate layer, wherein said underlayer comprises chrome, said first intermediate layer comprises $CoCr_xTa_y$, said second intermediate layer comprises $CoCr_{x1}Ta_{y1}$, said magnetic layer comprises CoPt, and wherein at least one of x and y is different from x1 and y1, respectively, and wherein a structure formed by said method has an MrT value, and wherein said first intermediate layer and said second intermediate layer contribute no more than 20% of said MrT value.

18. The method as described in claim 17 wherein said first intermediate layer is deposited to a thickness in the range of approximately 5–50 Å, said second intermediate layer is deposited to a thickness in the range of 5–100 Å, and said magnetic layer is deposited to a thickness in the range of 20–300 Å.

19. The method as described in claim 17 wherein said first intermediate layer is deposited to a thickness in the range of approximately 5–20 Å, said second intermediate layer is deposited to a thickness in the range of 20–80 Å, and said magnetic layer is deposited to a thickness in the range of 50–200 Å.

20. A method comprising:
providing a substrate;
depositing an underlayer over the substrate;
depositing a first intermediate layer over the underlayer, the first intermediate layer having a hcp structure;
depositing a second intermediate layer directly over the first intermediate layer, the second intermediate layer having a hcp structure; and
depositing a magnetic layer over the second intermediate layer,
wherein both of said first intermediate layer and said second intermediate layer are not magnetic.

21. A method comprising:
providing a substrate;
depositing an underlayer over the substrate;
depositing a first intermediate layer over the underlayer, the first intermediate layer having a hcp structure;
depositing a second intermediate layer directly over the first intermediate layer, the second intermediate layer having a hcp structure; and
depositing a magnetic layer over the second intermediate layer,
wherein a structure formed by said method has an MrT value, and wherein said first intermediate layer and said second intermediate layer contribute no more than 20% of said MrT value.

22. The method as described in claim 21 wherein said first intermediate layer and said second intermediate layer contribute no more than 10% of said MrT value.

23. The method as described in claim 21 wherein said first intermediate and said second intermediate layer contribute no more than 5% of said MrT value.

24. A disk drive comprising the structure described in claim 5, 8 or 9.

25. The structure as described in claim 1, 5, 8 or 9, further comprising a second magnetic layer formed over said magnetic layer.

26. The structure as described in claim 25 further comprising a spacer layer formed between said magnetic layer and said second magnetic layer.

27. The method as described in claim 13, 17, 20 or 21 further comprising forming a second magnetic layer over said magnetic layer.

28. The method as described in claim 27 further comprising forming a spacer layer between said magnetic layer and said second magnetic layer.

29. The structure as described in claim 5 wherein said magnetic layer comprises a CoCrPtTa alloy, and at least one of said first or second intermediate layers contains one or more materials selected from the list consisting of Pt, Pd, Ni, Nb, W and B.

30. The method as described in claim 17 wherein said magnetic layer comprises a CoCrPtTa alloy, and at least one of said first or second intermediate layers contains one or more materials selected from the list consisting of Pt, Pd, Ni, Nb, W and B.

31. A structure comprising:
a substrate;
an underlayer disposed over the substrate;
a first intermediate layer disposed over the underlayer, said first intermediate layer having a hcp structure;
a second intermediate layer disposed directly over the first intermediate layer, said second intermediate layer having a hcp structure; and
a magnetic layer disposed over the second intermediate layer, wherein said first and second intermediate layers are substantially non-magnetic; and
a second magnetic layer formed over said magnetic layer.

32. A structure comprising:
a substrate;
an underlayer disposed over the substrate;
a first intermediate layer comprising Co disposed over the underlayer, the first intermediate layer having a hcp structure;
a second intermediate layer comprising Co disposed directly over the first intermediate layer, the second intermediate layer having a hcp structure;
a magnetic layer disposed over the second intermediate layer; and
a second magnetic layer formed over said magnetic layer,
wherein at least one of said first intermediate layer and said second intermediate layer is not magnetic.

33. A structure comprising:
a substrate;
an underlayer disposed over the substrate;
a first intermediate layer disposed over the underlayer, the first intermediate layer having a hcp structure;
a second intermediate layer disposed directly over the first intermediate layer, the second intermediate layer having a hcp structure; and
a magnetic layer disposed over the second intermediate layer; and
a second magnetic layer formed over said magnetic layer,
wherein said structure has an MrT value, and wherein said first intermediate layer and said second intermediate layer contribute no more than 20% of said MrT value.

34. A method comprising:
providing a substrate;
depositing an underlayer over the substrate;
depositing a first intermediate layer over the underlayer, the first intermediate layer having a hcp structure;
depositing a second intermediate layer directly over the first intermediate layer, the second intermediate layer having a hcp structure;
depositing a magnetic layer over the second intermediate layer, wherein said first and second intermediate layers are substantially non-magnetic; and
forming a second magnetic layer over said magnetic layer.

35. A method comprising:

providing a substrate;

depositing an underlayer over the substrate;

depositing a first intermediate layer comprising Co over the underlayer, the first intermediate layer having a hcp structure;

depositing a second intermediate layer comprising Co directly over the first intermediate layer, the second intermediate layer having a hcp structure;

depositing magnetic layer over the second intermediate layer; and forming a second magnetic layer over said magnetic layer, wherein at least one of said first intermediate layer and said second intermediate layer is not magnetic.

36. A method comprising:

providing a substrate;

depositing an underlayer over the substrate;

depositing a first intermediate layer over the underlayer, the first intermediate layer having a hcp structure;

depositing a second intermediate layer directly over the first intermediate layer, the second intermediate layer having a hcp structure;

depositing a magnetic layer over the second intermediate layer; and forming a second magnetic layer over said magnetic layer, wherein a structure formed by said method has an MrT value, and wherein said first intermediate layer and said second intermediate layer contribute no more than 20% of said MrT value.

37. The structure as described in claim 31, 32 or 33 further comprising a spacer layer formed between said magnetic layer and said second magnetic layer.

38. The method as described in claim 34, 35 or 36 further comprising forming a spacer layer between said magnetic layer and said second magnetic layer.

39. Method of claims 13, 16, 20 or 21 wherein said magnetic layer is a longitudinal data recording layer.

40. Structure of claims 1, 4, 8 or 9 wherein said magnetic layer is a longitudinal data recording layer.

41. Method of claim 20 wherein said first and second intermediate layers comprise Co.

42. Structure of claim 8 wherein said first and second intermediate layers comprise Co.

* * * * *